US010532280B2

(12) United States Patent
Ishizawa et al.

(10) Patent No.: US 10,532,280 B2
(45) Date of Patent: Jan. 14, 2020

(54) GAME SYSTEM, AND STORAGE MEDIUM

(71) Applicant: Konami Digital Entertainment Co., Ltd., Minato-ku, Tokyo (JP)

(72) Inventors: Ayumi Ishizawa, Minato-ku (JP); Yuhei Ue, Minato-ku (JP); Mami Shimbo, Minato-ku (JP)

(73) Assignee: Konami Digital Entertainment Co., Ltd, Tokyo (JP)

( * ) Notice: Subject to any disclaimer, the term of this patent is extended or adjusted under 35 U.S.C. 154(b) by 318 days.

(21) Appl. No.: 15/396,724

(22) Filed: Jan. 2, 2017

(65) Prior Publication Data

US 2017/0106278 A1 Apr. 20, 2017

Related U.S. Application Data

(63) Continuation of application No. PCT/JP2015/069764, filed on Jul. 9, 2015.

(30) Foreign Application Priority Data

Jul. 11, 2014 (JP) .................................. 2014-143119

(51) Int. Cl.
*A63F 13/32* (2014.01)
*A63F 13/30* (2014.01)
(Continued)

(52) U.S. Cl.
CPC .............. *A63F 13/30* (2014.09); *A63F 13/32* (2014.09); *A63F 13/327* (2014.09); *A63F 13/33* (2014.09);
(Continued)

(58) Field of Classification Search
CPC ............. G07F 17/3262; G07F 17/3272; G07F 17/3274
See application file for complete search history.

(56) References Cited

U.S. PATENT DOCUMENTS

2011/0045910 A1* 2/2011 McKenna ............... G07F 17/32
463/42
2014/0038696 A1 2/2014 Fujimoto
(Continued)

FOREIGN PATENT DOCUMENTS

CN 102402643 A 4/2012
JP 9-155063 A 6/1997
(Continued)

OTHER PUBLICATIONS

Dragon Quest IX Defence people of starlit sky, Nintendo DREAM vol. 159, Mainichi Communications, Inc., Jul. 1, 2007, 12th vol. No. 7 159th vol. of the set, p. 8-11.
(Continued)

*Primary Examiner* — James S. McClellan
(74) *Attorney, Agent, or Firm* — Howard & Howard Attorneys PLLC

(57) ABSTRACT

Provided is a game system that is capable of suppressing time needed to share or exchange opinions between users in a game. This game system provides a quiz game that is played by eight users simultaneously. Furthermore, in a information share phase of the quiz game, the game system gives, via a game screen for selecting a region, a selection opportunity that is shared by the eight users such that eight selected regions corresponding to the eight users are selected individually by them from three region images of an enemy character image, and provides, in there, selection status information relating to the eight selected regions. Then, in a battle phase which follows the information share phase, the game system gives, based on the selection result in the information share phase, changes corresponding to the eight selected regions to the quiz game such that user characters attack the selected regions.

16 Claims, 10 Drawing Sheets

(51) Int. Cl.

| | | |
|---|---|---|
| *A63F 13/533* | (2014.01) | |
| *A63F 13/847* | (2014.01) | |
| *A63F 13/537* | (2014.01) | |
| *A63F 13/795* | (2014.01) | |
| *A63F 13/80* | (2014.01) | |
| *A63F 13/58* | (2014.01) | |
| *A63F 13/327* | (2014.01) | |
| *A63F 13/33* | (2014.01) | |
| *A63F 13/332* | (2014.01) | |
| *A63F 13/335* | (2014.01) | |
| *A63F 13/79* | (2014.01) | |
| *A63F 13/92* | (2014.01) | |

(52) U.S. Cl.
CPC .......... *A63F 13/332* (2014.09); *A63F 13/335* (2014.09); *A63F 13/533* (2014.09); *A63F 13/537* (2014.09); *A63F 13/58* (2014.09); *A63F 13/79* (2014.09); *A63F 13/795* (2014.09); *A63F 13/80* (2014.09); *A63F 13/847* (2014.09); *A63F 13/92* (2014.09); *A63F 2300/204* (2013.01); *A63F 2300/65* (2013.01); *A63F 2300/8064* (2013.01)

(56) References Cited

U.S. PATENT DOCUMENTS

| | | |
|---|---|---|
| 2014/0155176 A1 | 6/2014 | Mito et al. |
| 2014/0278834 A1* | 9/2014 | Lautz ................. G06Q 30/0203 705/12 |
| 2014/0295962 A1 | 10/2014 | Ikuta et al. |

FOREIGN PATENT DOCUMENTS

| | | |
|---|---|---|
| JP | 11-250275 A | 9/1999 |
| JP | 2003-325985 A | 11/2003 |
| JP | 2008049200 A | 3/2008 |
| JP | 2010-115 A | 1/2010 |
| JP | 2011147576 A | 8/2011 |
| JP | 2013-34554 A | 2/2013 |
| JP | 2014-30587 A | 2/2014 |
| JP | 5468155 B1 | 4/2014 |
| WO | 2013/187472 A1 | 12/2013 |

OTHER PUBLICATIONS

Little anchor and electric shock PlayStation vol. 444, ASCII Media Works, Inc., Apr. 10, 2009, 15th vol. with restriction of No. 15 475th vol. of the set, p. 72 to 73.

Notification of Reasons for Refusal (JP Application No. 2016-147500); Date of Drafting: Jan. 28, 2019; Includes English Translation; 7 pages.

Notification of Reasons for Refusal (JP Application No. 2016-147500); Date of Drafting: Jun. 29, 2018; Includes English Translation.

International Search Report (PCT/JP2015/069764); dated Oct. 6, 2015.

Drago Quest IX Defence people of starlit sky, Nintendo DREAM vol. 159, Mainichi Communications, Inc., Jul. 1, 2007, 12th vol. No. 7 159th folume of the set, p. 8-11.

The Second Office Action (CN Application No. 201580033712); dated Sep. 2, 2019; Includes English Translation; 14 pages.

Decision to Grant a Patent (JP Application No. 2016-147500); dated Sep. 3, 2019; Includes English Translation; 5 pages.

The First Office Action (CN Application No. 201580033712.6); dated Apr. 22, 2019; Includes English Translation; 15 pages.

* cited by examiner

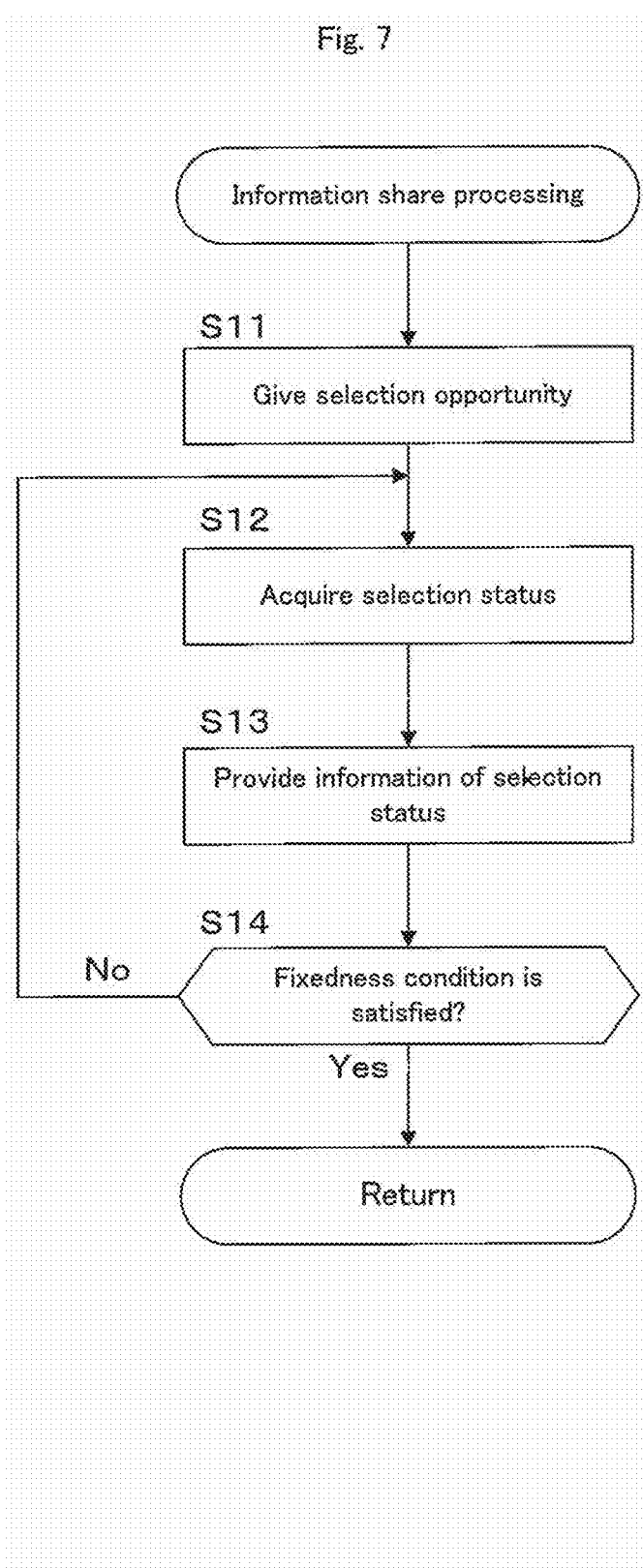

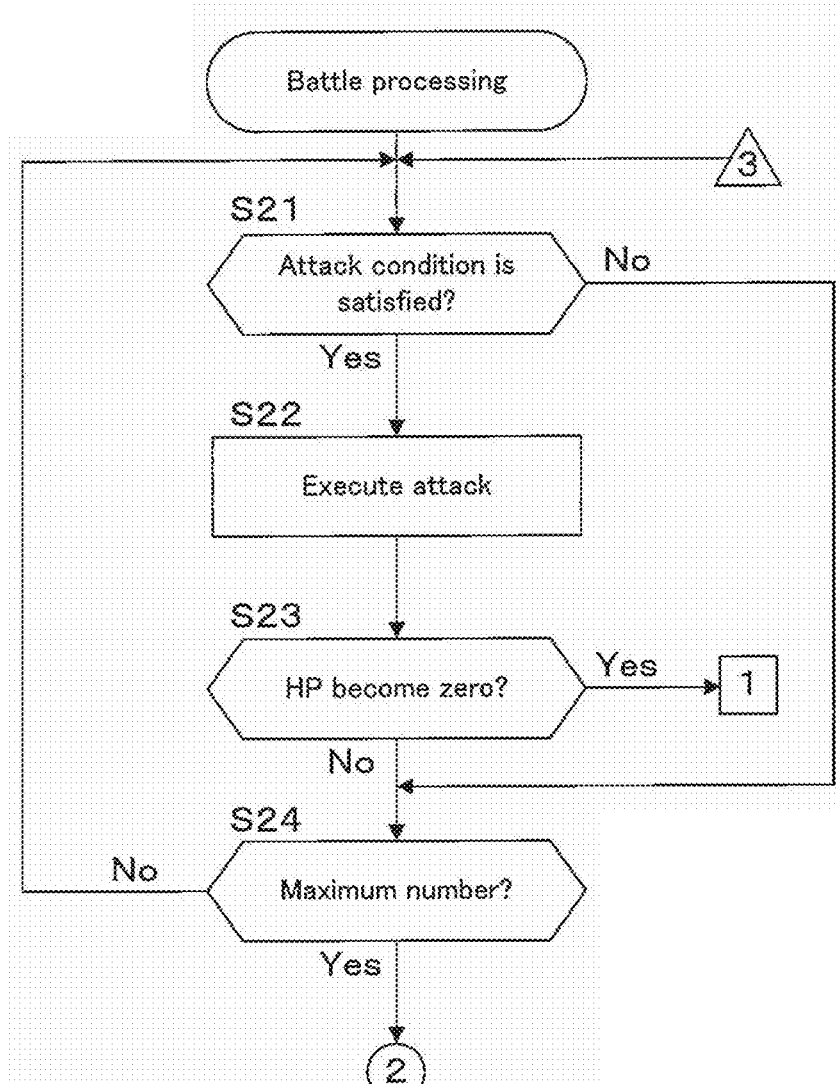

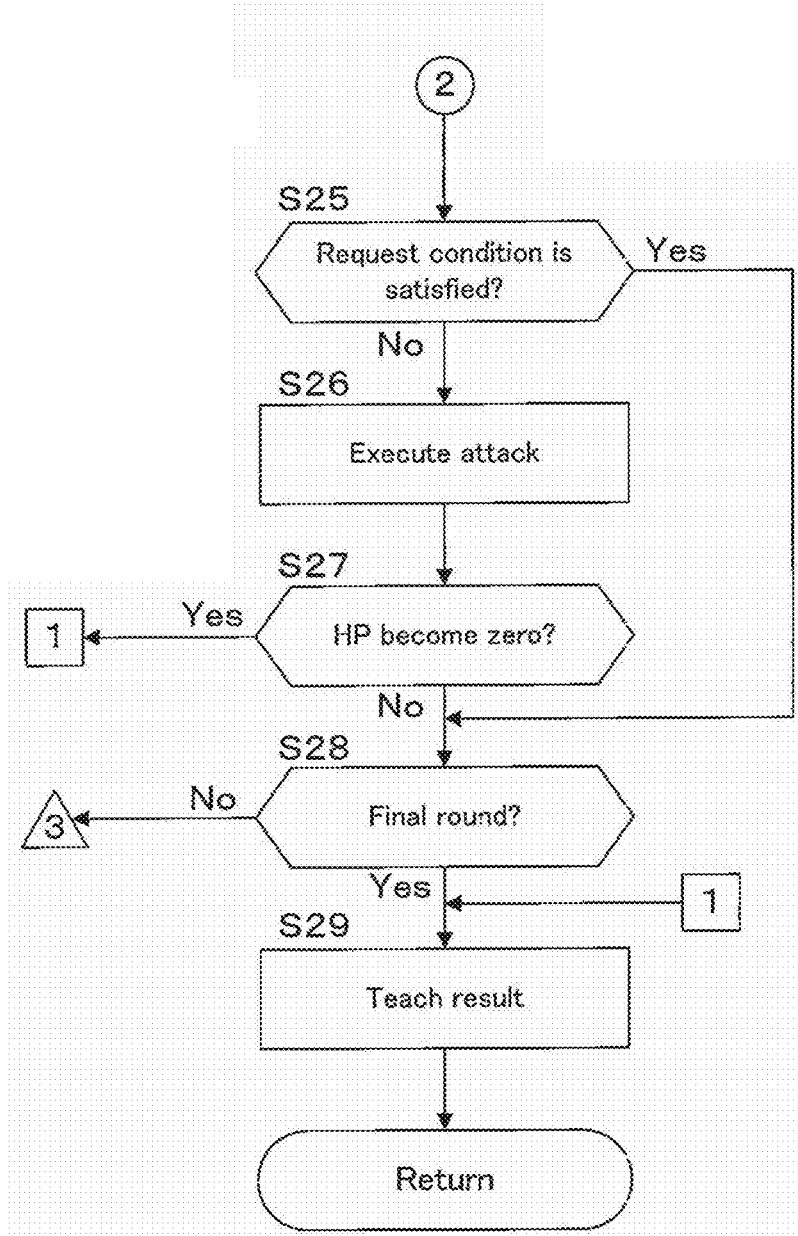

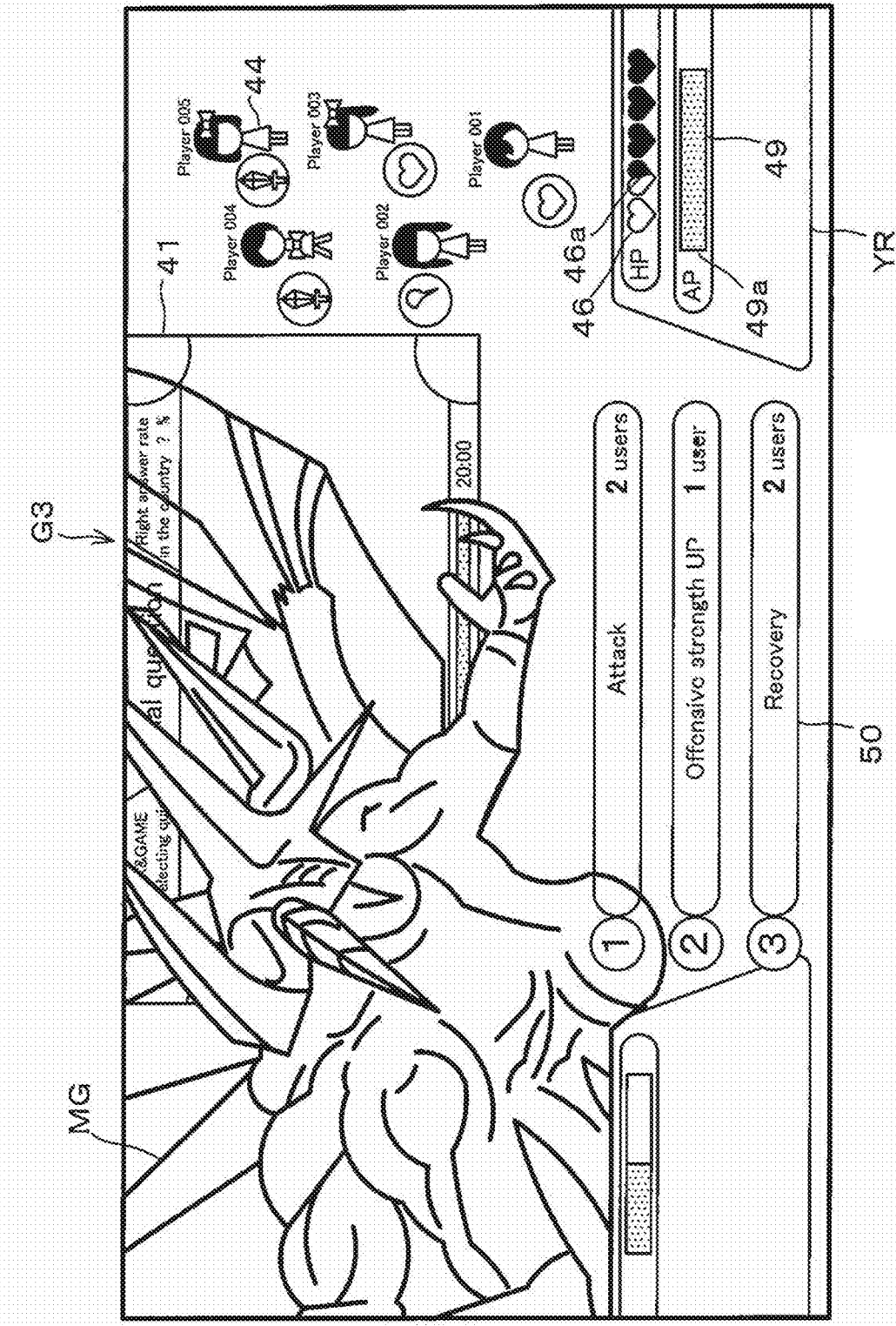

GAME SYSTEM, AND STORAGE MEDIUM

CROSS-REFERENCE TO RELATED APPLICATION

This application is a continuation of PCT Application No. PCT/JP2015/069764, filed Jul. 9, 2015, which claims priority to Japanese Patent Application No. 2014-143119, filed Jul. 11, 2014, the disclosures of which are hereby incorporated by reference in their entirety.

TECHNICAL FIELD

The present invention relates to a game system etc. that provides a game which is played by a plurality of users at the same time.

BACKGROUND ART

There is a game which is played by a plurality of users at the same time. As one example, there is known a game system that provides a quiz game which is played by a plurality of users at the same time through a plurality of user characters (for example, refer to Patent Document #1).

CITATION LIST

Patent Literature

Patent Document #1: Japanese Laid-Open Patent Publication 2008-49200.

SUMMARY OF THE INVENTION

Technical Problem

The game system such as the described in Patent Document #1 may not provide only a game of a battle type, but may also provide a game which is played by a plurality of users (player) in cooperation with each other. Further, such the users may play the game, via a plurality of gaming machines connected with each other by a network. In such a case, it is often the case that each user is separately placed physically from each other. On the other hand, during a play of a game, it may be needed to share or exchange opinions between users, for cooperation with each other. For example, the exchange and so on is needed, in cases such as a case in which missions in a game are shared, or a case in which roles (for example, a role of a attacker, a role of a defender, and so on) in a same mission are shared. In such cases, for example, the exchange of opinions and so on may be executed through text by functions of a chat, e-mail, and so on. However, in such cases, long time is required, since an entry of words and so on is needed. Further, users often feel bothersome. Furthermore, an opinion of each user shared separately from an actual action as information of a text. Therefore, there may be caused a difference between the actual action and the opinion of each user which is shared through the text. Such a trend increases with an increase of number of users being in cooperation Accordingly, the object of the present invention is to provide a game system etc. that is capable of suppressing time needed to share or exchange opinions between users in a game.

Means for Solution

The game system of the present invention is a game system that provides a game which is played by a plurality of users at the same time, and wherein the game system comprises: a opportunity giving device configured to give a selection opportunity which is shared by the plurality of users, such that a plurality of used options corresponding to the plurality of users respectively are selected by the plurality of users respectively from a plurality of options; and an information providing device configured to provide information of selection status relating to the plurality of used options in the selection opportunity.

The control method for controlling a computer of the present invention is a control method for controlling a computer which is incorporated into a game system that provides a game which is played by a plurality of users at the same time, and wherein the control method for controlling the computer comprises: a opportunity giving step that gives a selection opportunity which is shared by the plurality of users, such that a plurality of used options corresponding to the plurality of users respectively are selected by the plurality of users respectively from a plurality of options; and an information providing step that provides information of selection status relating to the plurality of used options in the selection opportunity.

Further, the non-transitory computer readable storage medium storing a computer program for a game system of the present invention stores a computer program for a game system that provides a game which is played by a plurality of users at the same time: and wherein the computer program for the game system is configured so as to cause a computer which is incorporated into the game system, to function as; a opportunity giving device configured to give a selection opportunity which is shared by the plurality of users, such that a plurality of used options corresponding to the plurality of users respectively are selected by the plurality of users respectively from a plurality of options, and an information providing device configured to provide information of selection status relating to the plurality of used options in the selection opportunity.

BRIEF DESCRIPTION OF THE DRAWINGS

FIG. 7 is a figure showing an example of a flow chart of an information share processing routine;

FIG. 8 is a figure showing an example of a flow chart of a battle processing routine;

FIG. 9 is a figure showing an example of a flow chart following after FIG. 8; and FIG. 10 is a figure schematically showing an example of details of a game screen for a battle when a quiz and a battle are provided separately.

DESCRIPTION OF THE EMBODIMENTS

Figure 1:
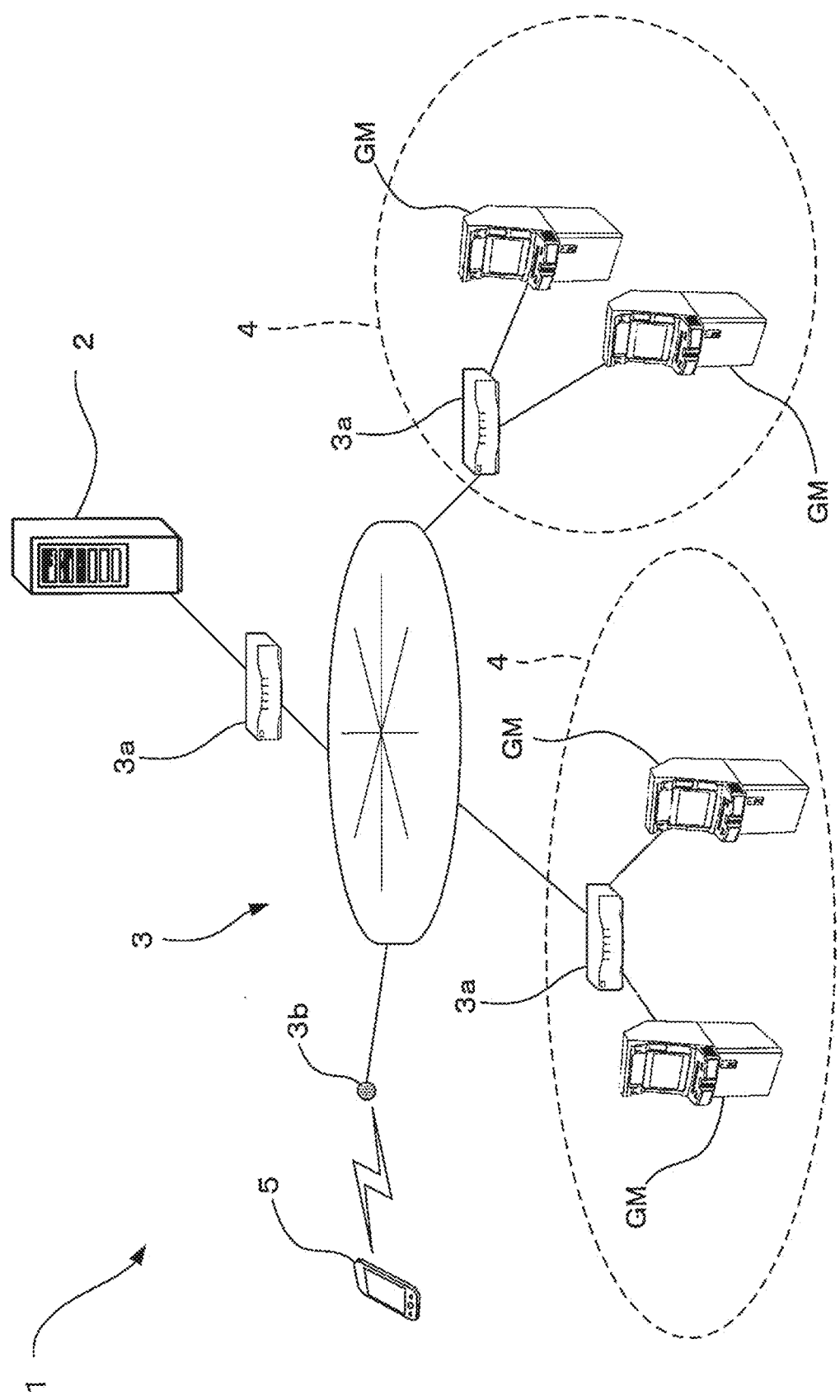
FIG. 1 is a figure showing a summary of the overall structure of a game system according to an embodiment of the present invention.

A game system according to an embodiment of the present invention will now be described below. FIG. 1 is a figure showing a summary of the overall structure of a game system according to an embodiment of the present invention. As shown in FIG. 1, the game system 1 includes a center server 2 serving as a server apparatus, and gaming machines GM. The gaming machines GM are connected to the center server 2 via a network 3. The gaming machines GM are gaming machines for business use (i.e. for commercial use) each of which, in exchange for expenditure of a predetermined consideration, enables the user to play a game over a range corresponding to that consideration. As one example, each of the gaming machines GM may provide a quiz game in exchange for expenditure of a predetermined consideration. An appropriate number of these gaming machines GM are installed in each of several commercial establishments such as stores 4 or the like. The center server 2 is not limited to the one shown in this example which consists of a single physical apparatus. For example, it would also be acceptable for a single logical center server 2 to be built as a server group that consists of a plurality of physical apparatuses. Moreover, it would also be acceptable for the center server 2 to be constituted logically using cloud computing. Yet further, it would also be acceptable to arrange for one of the gaming machines GM to function as the center server 2.

Moreover, user terminals 5 are connected to the center server 2 via the network 3. The user terminals 5 are a type of network terminal device serving functions of various types by executing software distributed from the center server 2. In the example shown in FIG. 1, as one kind of the user terminals 5, portable telephones (including smart phones) may be employed. Moreover, network terminal devices of various types that can be connected to the network and that moreover are compatible with individual use may be employed as the user terminals 5, such as, for example, personal computers, portable type gaming machines, and portable type tablet terminal devices, among others.

The network 3 may be built to implement network communication by, for example, employing the TCP/IP protocol. Typically, the network 3 will be configured by a combination of the internet as a WAN and intranets as one or more LANs. In the example of FIG. 1, the center server 2 and the gaming machines GM are connected to the network 3 via routers 3a, while the user terminal 5 is connected to the network 3 via an access point 3b.

Additionally, the network 3 is not limited to an embodiment employing the TCP/IP protocol. As the network 3, there may be employed various embodiments using a wireless line (including, for example, an infrared communication and a near field communication), a wired line for communications, or the like. For example, Communications between the user terminals 5 and the gaming machines GM may be implemented by employing a code (for example, a two-dimensional code) which is generated so as to include various information by conforming to a predetermined standard, without using lines (including wired lines and wireless lines) for communications. Therefore, terms of networks include methods which send and receive information without using lines, such as a communication method using such a code.

The center server 2 provides gaming machine services of various types to the gaming machines GM, or to their players. As the gaming machine service, for example, there may be provided a service of receiving player identification information from a gaming machine GM, and authenticating that player. Moreover, such a service may be provision of the service of receiving play data for an authenticated player from a gaming machine GM and storing that play data, or provision of the service of supplying stored play data to a gaming machine GM. Furthermore, a service of distributing and/or updating programs or data to the gaming machines GM via the network 3, a matching service of performing matching between users when a plurality of users are playing a common game with one another via the network 3, and so on may be included in these gaming machine services.

Furthermore, via the network 3, the center server 2 provides web services of various types to the users of the user terminals 5. These web services may, for example, include a game information service of supplying information of various types related to the games supplied by the gaming machines GM. Furthermore, these web services also include a distribution service of distributing data and applications of various types to the user terminals 5 (including updating data and so on). Moreover, apart from the above, these web services also include a community service of supplying a so called common forum for information sending, exchange, and sharing by users, a service of allocating user IDs for identifying users, and so on.

Figure 2:
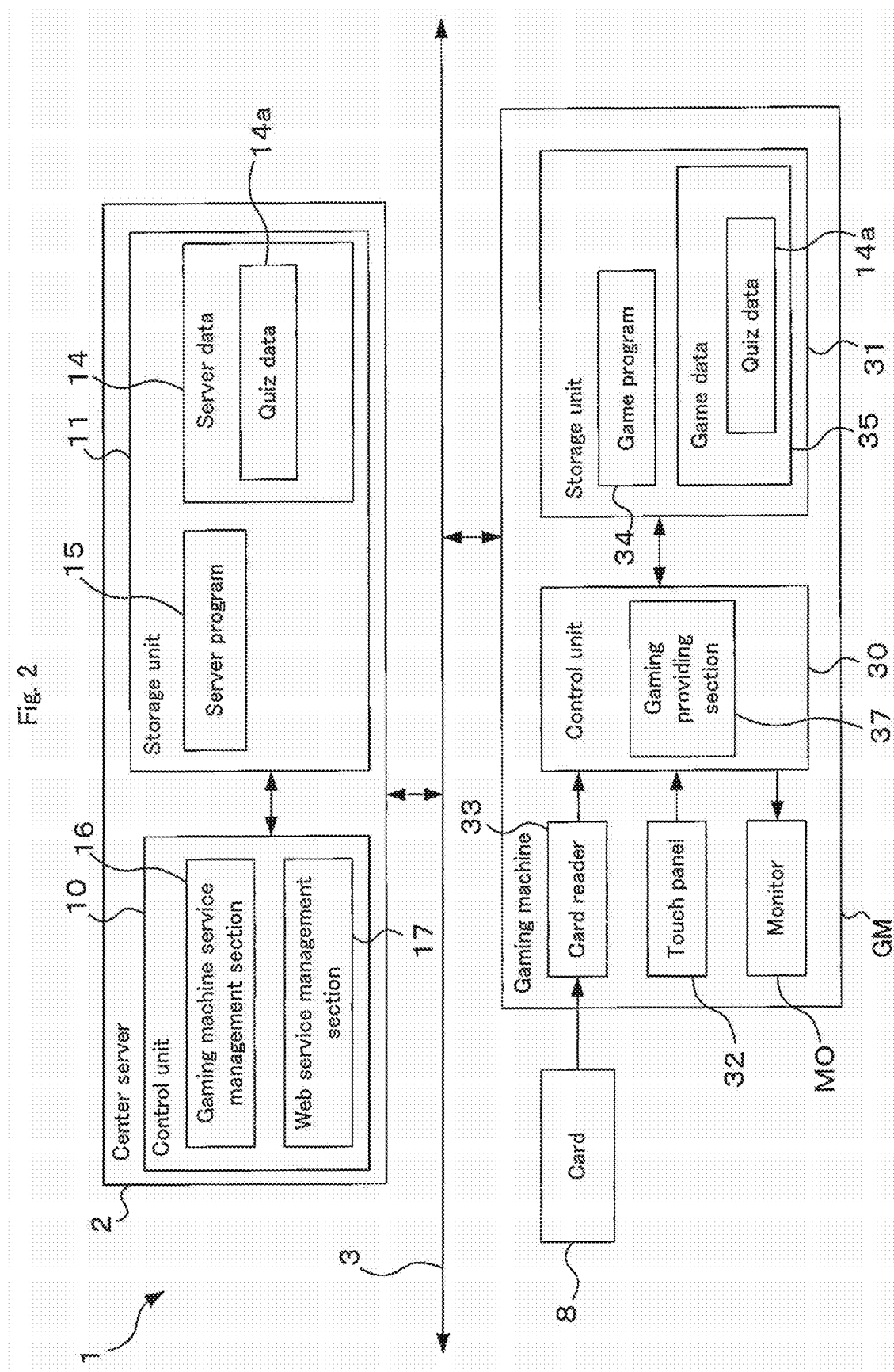
FIG. 2 is a figure showing the structure of principal portions of the game system related to its control system.

Next, principal portions of the game system 1 for actualizing a quiz game will now be further described. FIG. 2 is a figure showing the structure of principal portions of the game system 1 related to its control system. As shown in FIG. 2, the center server 2 comprises a control unit 10 and a storage unit 11. The control unit 10 is configured as a computer unit in which a microprocessor is combined with peripheral devices of various types such as internal storage devices (for example, ROM and RAM) and so on that are required for the operation of that microprocessor. Additionally, while input devices such as a keyboard and so on and output devices such as a monitor and so on can be connected to the control unit 10, these are not shown in the drawings.

The storage unit 11 is connected to the control unit 10. This storage unit 11 is configured with, for example, a high capacity storage medium such as magnetic tape or the like, so as to be capable of maintaining stored data even if no supply of power is provided. Server data 14 and a server program 15 are stored in the storage unit 11. The server program 15 is a computer program that is needed for the center server 2 to provide services of various types to the gaming machines GM and to the user terminals 5. A gaming machine service management section 16 and a web service management section 17 are provided internally to the control unit 10 by the control unit 10 reading in and executing this server program 15.

The gaming machine service management section 16 executes processing for providing the gaming machine services described above. On the other hand, the web service management section 17 executes processing required for providing the web services described above. The gaming machine service management section 16 and the web service management section 17 are logical devices that are actualized by combinations of computer hardware and computer programs. Additionally, apart from these, logical devices of various other types may be provided internally to the control unit 10, but these are omitted from the drawings.

The server data 14 is data which can be referred to with execution of the server program 15. For example, the server data 14 may include the play data described above, and ID management data. The play data is data in which information relating to user's play performance on the past is described. And, the play data is used for taking over previous play results (performance on the past) to subsequent play times, or for taking over setting details inherent in each user.

The ID management data is data for managing IDs of various types such as user ID or the like.

Moreover, as one example, the server data 14 may further include quiz data 14a. The quiz data 14a is data for managing quizzes (questions) and its answers which are provided in the quiz game. Therefore, quizzes are on the test based on the quiz data 14a, right or wrong of answers for the quizzes are judged. In concrete terms, for example, the quiz data 14a may include quiz ID, question information, option information, answer information, difficulty information, genre information, and right answer rate. The quiz data 14a is a set of records in which these types of information are described so as to establish a mutual correspondence.

The quiz ID is information for identifying each record. For example, unique numbers for every pieces of the question information is used as the quiz ID. The question information is information indicating details of each quiz which is given in the quiz game. On the other hand, the option information is information indicating details of each option which is prepared as a candidate of the answer. And, the answer information is information indicating details of the answer for each question. For example, information indicating an option corresponding to the right answer among options of answer candidates may be used as the answer information. Further, difficulty information is information defining difficulty level of each quiz. The genre information is information defining genres (category) to which each quiz belongs. The right answer rate is information indicating results of right answers. For example, past results of the quiz game, results of general right answer rate, or the like may be used as the results of right answers. As one example, the quiz data 14a is constructed so as to include these types of information. Additionally, apart from these, the quiz data 14a may include data of various other types, but these are omitted from the drawings.

On the other hand, a control unit 30 serving as a computer, a storage unit 31, a touch panel 32, a card reader 33, and a monitor MO are provided to the gaming machine GM. The storage unit 31, the touch panel 32, the card reader 33, and the monitor MO are all connected to the control unit 30. The control unit 30 is built as a computer unit in which a microprocessor is combined with peripheral devices of various types such as internal storage devices (for example, ROM and RAM) and so on that are required for the operation of that microprocessor. Additionally while, in common with a per se known gaming machine, input devices of various types and output devices of various types such as a control panel, a speaker, a coin authentication apparatus, and so on can also be connected to the control unit 30, these are not shown in the drawings.

The card reader 33 is a per se known device which reads information of a card 8 possessed by each user and outputs signals corresponding to the information to the control unit 30. For example, a non-volatility storage medium (not illustrated) such as an IC chip and a magnetic stripe is provided with the card 8. Further, a unique ID (hereafter, this will sometimes be described as a card ID) or the like are stored in each card 8. For example, the card ID is used for retrieving the play data stored in the center server 2. Further, for example, the card ID may be managed so as to be corresponded for every user to a unique user ID, by one-to-one, or many-to-one. Furthermore, value which is expended as the predetermined consideration when the quiz game is played may be stored in the card 8. And, via the card 8, the predetermined consideration for playing the quiz game may be paid.

On the other hand, the monitor MO is a per se known display device for displaying images of various types and so on, based on output signals from the control unit 30. The monitor MO displays game screens of various types for the quiz game, according to signals output by the control unit 30. In a similar manner, the touch panel 32 is a per se known output device outputting signals depending on touch positions of a user to the control unit 30. For example, a touch panel of transparent type may be employed as the touch panel 32. As one example, touch panel 32 is superimposed upon the monitor MO so as to cover the game screens and arranged so that positions corresponding to the game screens are touched.

On the other hand, the storage unit 31 is configured with, for example, a magnetic recording medium, an optical recording medium, a flash SSD (Solid State Drive), or the like, so as to be capable of maintaining stored data without receiving any supply of power. A game program 34 and game data 35 are stored in this storage unit 31. The game program 34 is a computer program that is needed for the gaming machine GM to supply the quiz game. A gaming providing section 37 is provided internally to the control unit 10 with execution of this game program 34. The gaming providing section 37 executes processing of various types that is needed to provide the quiz game. The gaming providing section 37 is a logical device that is actualized by combinations of computer hardware and computer programs. Additionally, apart from these, logical devices of various other types may be provided internally to the control unit 30, but these are omitted from the drawings.

The game data 35 is data that can be referred to with the execution of the game program 34. For example, the game data 35 may include image data, sound effect data, the ID management data, the play data, and the quiz data 14a described above. As one example, at least a part of the ID management data, the play data, and the quiz data 14a is provided from the center server 2 such that a necessary part is included in there. The image data is data that is needed to display images of various types such as the game screens of various types for the quiz game and so on, on the monitor MO. The sound effect data is data that is needed to reproduce sounds of various types for the quiz game such as a sound effect, from a speaker. Additionally, apart from these, the game data 35 may include data of various other types, but these are omitted from the drawings and the description.

Next, a quiz game that is supplied by the gaming machine GM will be described. The quiz game is a game of a type which gives a user a quiz (question) and requests an answer for the quiz to the user. As one example, the answer is selected from options of answer candidates which are prepared in the game in advance, and whether it is right or wrong is judged. Further, play modes of various types are prepared in the quiz game. For example, a mode for a single play played by each single user, and a mode for a multiple play played by multiplayer together may be included in such play modes. Furthermore, as one example, the mode for the multiple play may include a mode for a user battle in which users are battled with each other, and a mode for a cooperation play in which users cooperate with each other.

The quiz game provides a story mode or a practice mode as a mode for the single play. Further, the story mode and the practice mode include mode details, such as a plurality of stories and a plurality of practices. On the other hand, for example, the quiz game provides a tournament mode as a mode for the user battle, and an enemy character battle mode as a mode for the cooperation play. Further, as one example of the mode details, as well as the story mode and so on, the tournament mode includes a plurality of tournaments of forms of various types, the enemy character battle mode includes a plurality of battles which battle with enemies of various types. Additionally, the story mode may be prepared as a mode for the user battle and a mode for the user cooperation play. Further, as one of example, an enemy appearing in the story mode may be used as an enemy of a mode for the user cooperation play.

Further, as one example, these modes are played through a user character serving as an ally character. The user character functions as a play medium corresponding to each user. That is, quizzes are given to the user character corresponding to each user, answers for the quizzes are selected through the user character, in the quiz game. As one example, results of the answers may be recorded sometimes, as performance of the user character. For example, the story mode is a mode in which a story is developed through the user character as a main character, and in which the story progresses by the answers for the quizzes. Further, the practice mode is a mode for executing a generally quiz game.

On the other hand, the tournament mode is a mode in which users' battle with each other individually on a manner of tournament through the user character. The enemy character battle mode is a mode in which a plurality of user characters battle with an enemy character(s) functioning as an opponent, while cooperating with each other. In concrete terms, in the enemy character battle mode, through each quiz and answer for the user character, a plurality of user characters battles as one team together against a common enemy character(s). And, as one example, through a play of these modes, each user character may grow up (for example, parameters of various types defining the user character such as an offensive strength and a defensive strength go up). As one example, such play modes are prepared. And, an element of an action game or a role playing game are added to the quiz game, by including these play modes. That is, the quiz game is configured as a multiple quiz game in which an element of a quiz is combined with other elements such as an action. As the results, the quiz game also can function as an action game or a role playing game using a quiz, through these play modes.

Figure 3:
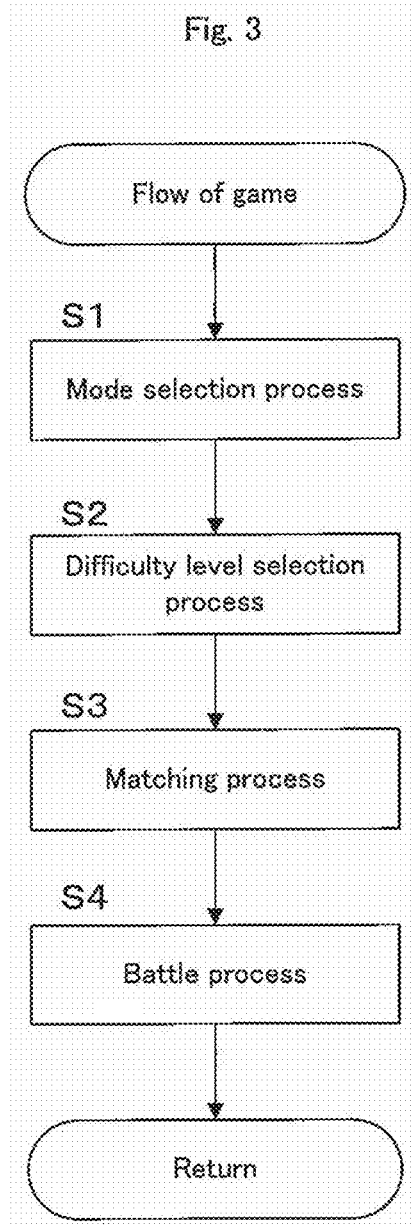
FIG. 3 is an explanatory figure for explaining an outline of a flow of a quiz game.

Referring to FIG. 3, one example of a flow of the quiz game will now be described. FIG. 3 is an explanatory figure for explaining an outline of a flow of the quiz game. As one example, the example of FIG. 3 shows a case in which an enemy character battle mode is played. As shown in FIG. 3, the quiz game includes a mode selection process (step S1), a difficulty level selection process (step S2), a matching process (step S3), and a battle process (step S4) in order. Additionally, the quiz game may include other appropriate processes such as a rule explanation process and so on, as necessary.

The mode selection process is a process for selecting the play modes described above. That is, in the mode selection process, a play mode is selected by each user. As one example, when the enemy character battle mode has been selected, the selection of a play mode further includes a selection of the enemy character. That is, a selection of the play mode such as the enemy character battle mode, and a selection of the mode details such as the enemy character are executed in the mode selection process (step S1).

The difficulty level selection process is a process for setting a difficulty level. In concrete terms, in each play mode of the quiz game, for example, there are prepared difficulty levels such as three levels, in advance. In the difficulty level selection process, a difficulty level which is played is selected from these difficulty levels (step S2). Further, as one example, the difficulty level may be reflected to strength of the enemy character which will be battled. Or, the difficulty level may be reflected to a difficulty level of quizzes which will be given. And, as one example, a growth level obtained when the user has won the enemy character, that is, when the user has cleared the battle with the enemy character, may increase with increasing the difficulty level.

On the other hand, when a level is set to each user character, options of the difficulty level may be limited according to the level of each user character. For example, there may be prepared a difficulty level which can be selected only by each user character with the difficulty level being over a predetermined level. And, for example, the level of each user character may change through a play of modes of various types as a part of a growth. Further, for example, when genres (categories) such as "sport" and "entertainment" are set to a quiz, a genre of a target of the quiz which will be given may be selected in the difficulty level selection process.

Furthermore, characteristic features of various types may be set to each user character. For example, attributions such as "fire", "water", and "earth" may be employed as the characteristic features. That is, each user may set an attribution corresponding to each user character in the difficulty level selection process by the selection and so on. In a similar manner, the attributions may be set also to the enemy character. Further, as one example, compatibility may be set to each attribution. And, by set attributions between each user character and the enemy character, difference may accrue on effect of battle actions in the battle process. Additionally, an attribution may be set in advance as a fixed personality of each user character. In this case, the selection of an attribution may be skipped in the difficulty level selection process.

The matching process is a process for matching each user character playing together. That is, the matching process is executed for fixing each user character forming a team (step S3). As one example, via the network 3, each user plays the quiz game through each gaming machine GM at the same time. Therefore, as one example, matching may be executed in the matching process such that each gaming machine GM corresponds to each user character. Further, as one example, matching is executed such that each user character who selects same difficulty level forms a team. Furthermore, for example, when a genre of the quiz is selected, information of the genre may be considered into matching. In concrete terms, matching may be executed such that each user who has selected a different genre is included in a same team equally, or such that one team is formed by each user who has selected a same genre. In a similar manner, as one example, when the characteristic features are set to user characters, matching may be executed so as to consider the characteristic features (for example, such that each user character having each characteristic feature is included in a team equally). Furthermore, the level of each user character may be considered into matching.

The battle process is a process in which a battle with the enemy character is executed. The battle with the enemy character progresses through quizzes and the answers. Therefore, in the battle process, a general so-called quiz game is also provided. That is, a multiple quiz game including an element of an action game is provided in the battle process (step S4). As one example, in the battle process, the game progresses along such a flow described above.

Figure 4:
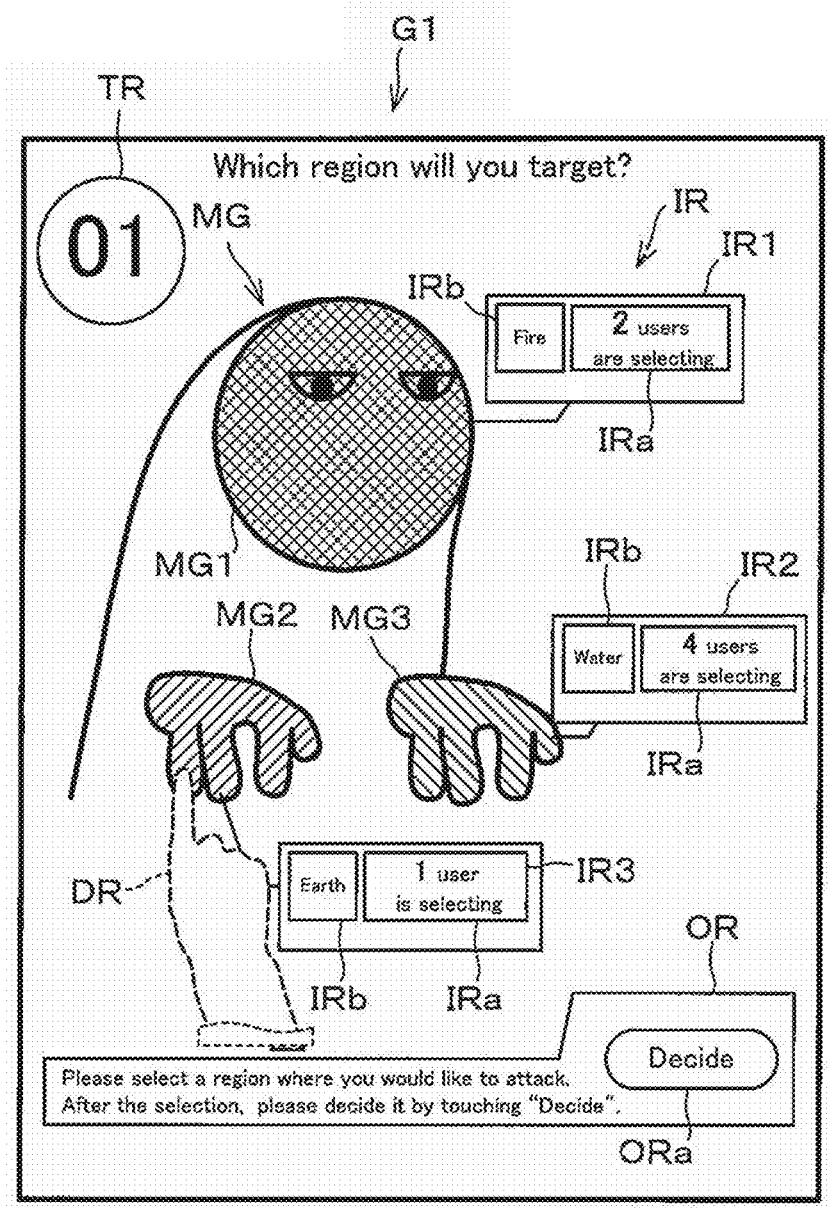
FIG. 4 is a figure schematically showing an example of a game screen for selecting a region which is provided in an information share phase.
Figure 5:
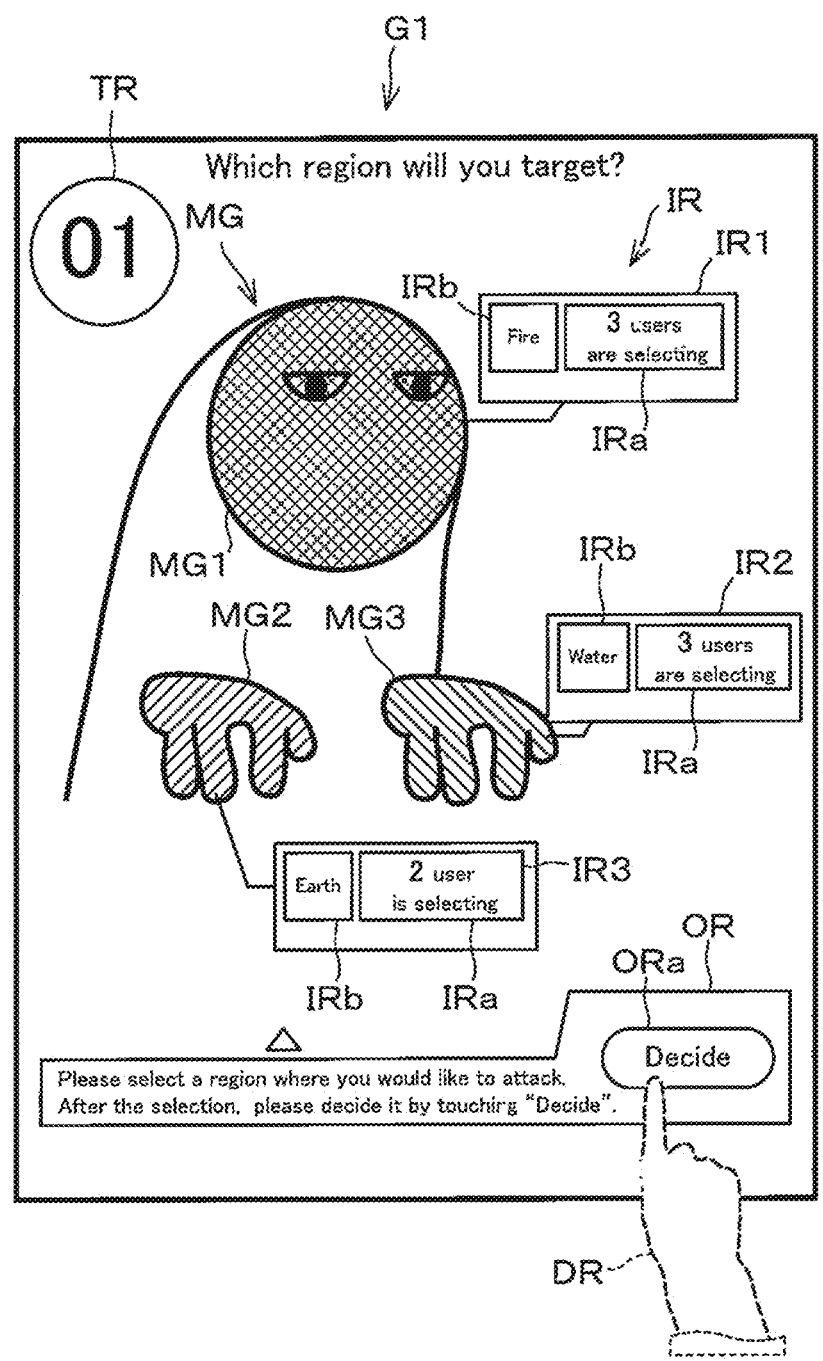
FIG. 5 is a figure schematically showing an example of the game screen for selecting a region after a selection in the example of FIG. 4.
Figure 6:
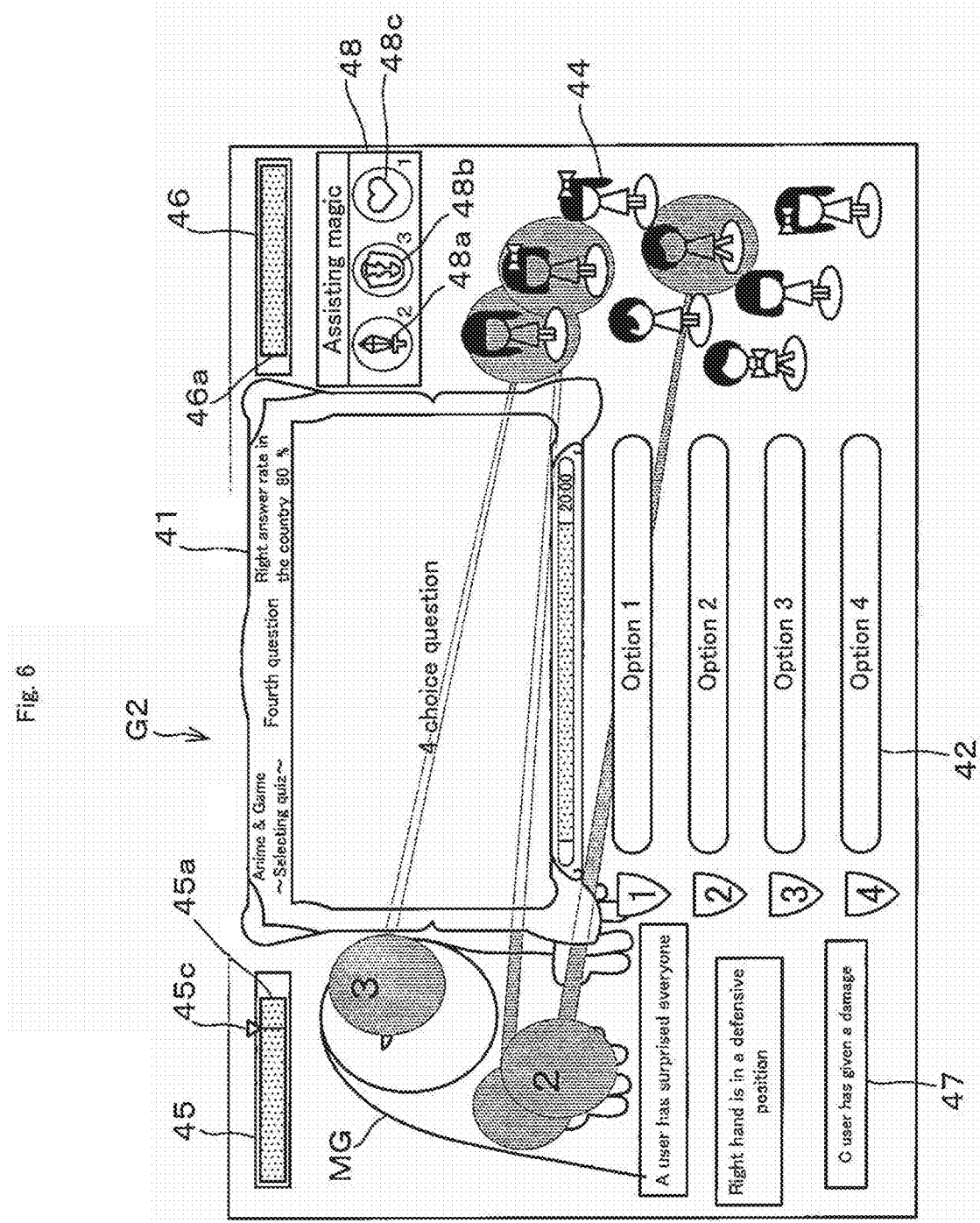
FIG. 6 is a figure schematically showing an example of a game screen for a quiz which is provided in a battle phase.

Referring to FIG. 4 to FIG. 6, the battle process will now be described further. As described above, in the battle process, there is provided the multiple quiz game to which the element of the action game is added. In concrete terms, as the multiple quiz game, there is provided a game of type in which each user character battles the enemy character in cooperation with other user character belonging to a same team by answering quizzes. Further, in the quiz game, the answer of each user character for a quiz corresponds to an action of the battle with the enemy character directly. That is, the answer for a quiz is used directly as the action which attacks the enemy character. Therefore, the quiz game is configured such that an element of the quiz fuses seamlessly with an element of the action.

As one example, in order to provide such the quiz game described above, the battle process includes an information share phase serving as a selection opportunity, and a battle phase. And, as one example, in the battle process, the information share phase and the battle phase are provided in order of this sequence. The battle phase is a phase in which a battle with the enemy character using a quiz is executed. That is, in the battle phase, there is executed the quiz game described above itself.

On the other hand, the information share phase is a phase for sharing (or exchanging) information between users in a team. That is, the information share phase is prepared for assisting the battle phase. Therefore, as one example, in the information share phase, there is shared information which is needed to actualize a team play in the battle phase, that is, needed to a play in cooperation with users. For example, when a battle with a plurality of enemy characters is executed in the battle phase, in the information share phase, there is shared information of the enemy character which will be attacked by each user character. In a similar manner, when a plurality of battle actions is prepared in the battle phase, in the information share phase, there may be shared information of a battle action which should be executed by each user character.

Both the information share phase and the battle phase are shared by each user. That is, the information share phase and the battle phase is provided to each user character in a team at almost same time during approximately the same period. Further, in the information share phase and the battle phase, details of a play of each user are reflected commonly to a game screen of each gaming machine GM, such that these phases progress at the same time. And, as one example, the information share phase and the battle phase are actualized through such the game screen.

Referring to FIG. 4 and FIG. 5, details of the information share phase will now be described first. As one example, the information share phase includes a selection opportunity. For example, the selection opportunity is an opportunity for selecting each enemy character or each battle action described above. And, as the information which is needed to a play, information of selection status of each user in this selection opportunity is shared with other users in the information share phase.

FIG. 4 and FIG. 5 are figures schematically showing examples of game screens which are provided in the information share phase respectively. In concrete terms, FIG. 4 is a figure schematically showing an example of a game screen for selecting a region which is provided in the information share phase. Further, as one example, the example of FIG. 4 shows a case in which an enemy character battling with user characters in the battle phase includes a plurality of regions serving as a plurality of parts which functions respectively as attack targets. In this case, as one example, the game screen for selecting a region is used for a provision of the selection opportunity for selecting each region of the attack targets, and for share of information of selection status of each region in the selection opportunity.

As shown in FIG. 4, as one example, the game screen G1 for selecting a region includes a remaining time teaching area TR, an enemy character image MG, an information share area IR, and an operation teaching area OR. The remaining time teaching area TR is an area showing remaining time in the information share phase, that is, information of remaining time in which the game screen G1 for selecting a region can be used. The enemy character image MG is an image showing the enemy character. Further, as one example of each region, the enemy character image MG includes a head region image MG1, a right hand region image MG2, and a left hand region image MG3. Therefore, each user selects an attack target of each user character from these regions MG1 to MG3 respectively, through each gaming machine GM. And, for example, characteristic features may be set to these regions MG1 to MG3. As the characteristic features, for example, there may be employed HP which functions as value determining whether or not the battle can continue. That is, as one example, each region MG1 to MG3 may function similar to an independent enemy character, and the enemy character may be cleared every region MG1 to MG3. And, whole of the enemy character may be defeated with clearing of all regions. Furthermore, attributions, genres of quizzes and so on may be employed as the characteristic features. That is, the attribution such as "fire" or the genre such as "sport" may be set to each region MG1 to MG3, similar to each user character.

The operation teaching area OR is an area for teaching information of operations which should be executed by users in the game screen G1 for selecting a region. Further, as one example, the operation teaching area OR includes a decision button image ORa. The decision button image ORa is used for decision of a region of an attack target. That is, a region which is attacked by each user character is decided with a use of the decision button image ORa, after each region MG1 to MG3 has been selected. As the results, a change of a selected region is allowed until the attack target is decided through the decision button image ORa. In other words, each region MG1 to MG3 functions as each of candidates of options which can be changed appropriate until the decision. And, one selected region is decided with the use of the decision button image ORa, the one region is fixed as an attack target of each user character. Further, each region MG1 to MG3 which is selected by each user functions as use options of the Claims.

On the other hand, the information share area IR is an area for displaying information of a share target. For example, as described above, the information of selection status is displayed as the information of the share target. That is, as one example, the information of selection status about each region which is selected by each user as the attacking target is displayed in the information share area IR. Further, as one example, the information share area IR includes a first information share area IR1, a second information share area IR2, and a third information share area IR3.

The first information share area IR1 is an area for showing number of user characters which attack the head region image MG1 as the attack target, as information of the region which will be attacked by each user character. In concrete terms, there is displayed number of user characters which is selected (before fixedness) or has been fixed as the target for attacking the head region image MG1. As one example, the first information share area IR1 includes a selection number information section IRa for displaying the number of such user characters. Further, as one example, the information share area IR may include an attribution information section IRb. The attribution information section IRb is a section for displaying information of the attribution of each region MG1 to MG3. That is, when the attribution is set to each region MG1 to MG3, its information may be displayed through the attribution information section IRb.

In a similar manner, the second information share area IR2 is an area for showing number of user characters which will attack the left hand region image MG3 as the target, and the third information share area IR3 is an area for showing number of user characters which will attack the right hand region image MG2 as the target. And, information of such number is displayed in the selection number information section IRa of the second information share area IR2 or the third information share area IR3. Furthermore, information of the attribution of the left hand region image MG3 may be displayed in the attribution information section IRb of the second information share area IR2, and information of the attribution of the right hand region image MG2 may be displayed in the attribution information section IRb of the third information share area IR3.

In the example of FIG. 4, information of "two users are selecting" is displayed in the selection number information section IRa of the first information share area IR1, information of "four users are selecting" is displayed in the selection number information section IRa of the second information share area IR2, and information of "one user is selecting" is displayed in the selection number information section IRa of the third information share area IR3. That is, in this case, the head region image MG1 is considered (selected or fixed) by two users as the attack target. In a similar manner, the left hand region image MG3 is considered by four users as the attack target, and the right hand region image MG2 is considered by one user as the attack target. As described above, the information of the selection status of each user is provided to other users, through the information share area IR. Additionally, apart from these, for example, information such as the characteristic features described above including a user name and a user character name may be displayed in the information share area IR. For example, when the characteristic features are shared, information of the characteristic feature of each user character who will attack each region is provided to each user. Due to this, a selection of more adequate region is facilitated. As described above, useful information of various types for a selection of each user may be displayed in the information share area IR.

Further, for example, in the operation teaching area OR, there is displayed information such as "please select a region where you would like to attack". In this case, a touch operation using the touch panel 32 is employed as one example of an operation for the game screen G1 for selecting a region. That is, in this case, a selection or a decision of each region MG1 to MG3 is executed by a touch operation for each region MG1 to MG3 or for the decision button image ORa. On the other hand, information of "01" showing remaining one second is displayed in the remaining time teaching area TR. That is, a touch operation to any one of regions MG1 to MG3 is required in remaining one second. And, as showed by an broken line DR (this is not displayed on the actual game screen G1 for selecting a region), the example of FIG. 4 shows a case in which the right hand region image MG2 having few user characters who will attack it at this time is selected as the attack target.

FIG. 5 is a figure schematically showing an example of the game screen G1 for selecting a region after a selection in the example of FIG. 4. As shown in FIG. 5, information of "two users are selecting" is displayed in the selection number information section IRa of the third information share area IR3. That is, as compared to the example of FIG. 4, with a result of a touch operation for the right hand region image MG2, number of users who will attack the right hand region image MG2 as the target is increasing by one user.

In a similar manner, as compared to the example of FIG. 4, number of users who will attack the head region image MG1 as the target is increasing by one user, while number of users who will attack the left hand region image MG3 as the target is decreasing by one user. That is, the attack target has been changed by one user to the head region image MG1 from the left hand region image MG3. As the results, bias of attack targets is dissolved in the example of FIG. 5 than the example of FIG. 4. As described above, as one example, the game screen G1 for selecting a region is used for sharing the selection status of other users. And, a region of an attack target is fixed, by a touch operation to the decision button image ORa. As one example, such the game screen G1 for selecting a region is displayed on each gaming machine GM in the same way, while a subjective display (a display depending on each user character) is different according to used user character. And, an information share phase is actualized through such the game screen G1 for selecting a region.

Additionally, apart from these, for example, the information share area IR may include a fixed information section for displaying information of number of use characters after fixed. And, information of number of user characters being in a selection and information of number of fixed user characters may be displayed so as to be distinguished from each other by the fixed information section and the selection number information section IRa.

Next, referring to FIG. 6, details of a battle phase will now be described. FIG. 6 is a figure schematically showing an example of a game screen for a quiz which is provided in the battle phase. The example of FIG. 6 shows a case in which a team is formed by eight users. As shown in FIG. 6, the game screen G2 for a quiz includes a quiz information area 41, each answer candidate section 42, a enemy character image MG, each user character image 44, a enemy HP gauge 45, and a user HP gauge 46.

The quiz information area 41 is an area for displaying information relating to a quiz. As one example, in the quiz information area 41, there is displayed information which is needed to a quiz, such as details (that is, question itself) of a quiz (question), information showing right or wrong (for example, "right"), a genre (for example, "Anime & Game"), a right answer rate (for example, "80%"), number of questions (for example, "Fourth question"), and answer time (for example, "20:00" showing twenty seconds), and so on. On the other hand, each of answer candidates ("Option 1", "Option 2" and so on) are displayed in each answer candidate section 42. Further, as described above, the enemy character image MG is an image showing the enemy character of an opponent which battles each user character. In a similar manner, each user character image 44 is an image showing each user character in a team. For example, eight user character images 44 respectively corresponding to eight user characters are displayed.

The enemy HP gauge 45 is a gauge extending linearly. The enemy HP gauge 45 is used for showing an amount of HP 45a of the enemy character. Therefore, when the remaining amount of HP 45a of the enemy HP gauge 45 became zero, the enemy character is defeated due to lack of capability to keep the battle, and a team of user side wins the battle with the enemy character. In concrete terms, when each user character has correctly answered a quiz which is given to each user character, the remaining amount of HP 45a decreases. That is, a right answer for a quiz to each user character functions as an attack to the enemy character directly. A predetermined number of quizzes are given to each user character, as the results, when the remaining amount of HP 45a of the enemy HP gauge 45 became zero, a team of user side is judged as a win.

As one example, the user HP gauge 46 is a gauge extending linearly, similar to the enemy HP gauge 45. The user HP gauge 46 is used for showing an amount of HP 46a corresponding to a team of user side. That is, the HP 46a is associated and shared with each user character in a team commonly. Further, as one example, the amount of the HP 46a may be determined according to HP amount of each user character, such as a total of HP amounts which is set as one of parameters to each user character forming a team. And, when the remaining amount of HP 46a of the user HP gauge 46 become zero, the team, that is, all of users corresponding to the team are judged as being incapable of the battle. As the results, a mission for defeating the enemy character is judged as failure, and each user character loses the battle with the enemy character.

As one example, when the team of user side has not satisfied a request condition on the test of a quiz, the enemy character executes an attack for decreasing HP 46a of the team of user side. Further, a decrease amount of HP 45 of the enemy character may be employed as one example of the request condition. That is, the request condition is satisfied when the team of user side decreases the HP 45a of the enemy character by a predetermined amount through the right answer of a quiz by each user character, and an attack of the enemy character is not executed. On the other hand, each user character is attacked by the enemy character when the team of user side can not decrease the HP 45a of the enemy character by the predetermined amount, since the request condition is not satisfied.

Further, as one example, a request value mark 45c for showing the decrease amount which satisfies the request condition may be displayed on the enemy HP gauge 45. Furthermore, as one example, each quiz may be given so as to be divided into a plurality of rounds. And, it may be determined whether or not the request condition is satisfied every rounds, and advisability of an attack of the enemy character may be judged. Further, for example, same number of quizzes may be given synchronously to each user (each gaming machine GM). Furthermore, details of each quiz may coincide to each other between users (user characters). As one example, a predetermined number of quizzes is given through such a plurality of rounds, as the results, winning or losing of the battle is judged.

In the example of FIG. 6, three users answer a quiz correctly, and the enemy character is attacked by three user characters respectively corresponding to these three users. In concrete terms, the right hand image MG2 is attacked by two user characters who have selected the right hand image MG2. And, one of them gives damage of "2" to the right hand region, another can not give damage. In a similar manner, the head region image MG1 is attacked by one user character who has selected the head region image MG1, and damage of "3" is given. That is, the HP 45a of the enemy character decreases by "2" or "3", through right answers of the quiz of three users corresponding to these three user characters. Further, an effect when an answer for the quiz is right, that is, a decrease amount of the HP 45a of the enemy character may be determined according to parameters of various types such as a level, or an offensive strength of each user character. Furthermore, when an attribution or a genre is set to each region MG1 to MG3, the attribution or the genre of each user character may be considered.

Further, as one example, an attack information area 47 may be added to the game screen G2 for a quiz. For example, information showing an attack result such as "A user has surprised everyone" may be displayed in the attack information area 47. Further, the information showing the attack result may be determined according to the effect when an answer for a quiz is right. On the other hand, in the example of FIG. 6, the remaining amount of the HP 45a of the enemy character is still large than the request value mark 45c. Therefore, if this round will be finished at this rate, an attack will be executed by the enemy character. In this case, as one example, a defensive strength of each user character forming a team may be considered into an effect of the attack of the enemy character, that is, a decrease amount of the HP 46a of user side. For example, a difference between a total of defensive strengths of users forming the team and an offensive strength of the enemy character may be employed as the decrease amount. As one example, similar to the game screen G1 for selecting a region, such the game screen G2 for a quiz is displayed on each gaming machine GM in the same way, while a subjective display (a display which depends on each user character) is different according to used user character. And, a battle phase is actualized through such the game screen G2 for a quiz.

Additionally, for example, apart from these, the game screen G2 for a quiz may include an item information section 48. As one example, an item which can be used in the battle may be displayed in the item information section 48. Further, as shown in FIG. 6, a sword mark item 48a, a shield mark item 48b, and a heart mark item 48c may be used as one example of the item. And, for example, the sword mark item 48a may raise the offensive strength, and the shield mark item 48b may raise the defensive strength. On the other hand, for example, the heart mark item 48c may recover the amount of HP 46a. These items may be used appropriately in the battle. Further, number of possessions showing usable number may be displayed on a side of each item such as the sword mark item 48a. And, as one example, the number of possessions about the sword mark item 48a and so on may be determined by a selection of each user at starting time and so on of the battle process or the matching process. That is, number of the sword mark item 48a and so on which is used in a battle among items which is possessed by each user may be set by each user in advance through a selection.

Next, an information share processing and a battle processing will be described. The information share processing is processing for providing a selection opportunity common to users, and for providing information of selection status of other users in the selection opportunity. As one example, the selection opportunity and the information of selection status are shared in an information share phase. Therefore, as one example, the information share processing is executed in order to actualize the information share phase of a battle process. On the other hand, the battle processing is processing for actualizing a battle with an enemy character. As one example, the battle with an enemy character is executed in a battle phase. Therefore, as one example, the battle processing is executed in order to actualize the battle phase of a battle process.

For example, the information share processing is actualized by the control unit 30 of the gaming machine GM through a routine of FIG. 7, and the battle processing is actualized by the control unit 30 of the gaming machine GM through a routine of FIG. 8 and FIG. 9. Further, as one example, FIG. 7 to FIG. 9 are executed through the gaming providing section 37 of the control unit 30. Additionally, apart from the above, the control unit 30 of the gaming machine GM, and the control unit 10 of the center server 2 also execute per se known processing of various types and so on, either singly or in cooperation. However, detailed explanation of these is omitted.

FIG. 7 is a figure showing an example of a flow chart of an information share processing routine for actualizing the information share processing. As one example, the routine of FIG. 7 is executed after a matching process (step S3), that is, with beginning of a battle process (step S4). When the routine of FIG. 7 is started, the gaming providing section 37 gives a selection opportunity in a first step S11. As one example, the selection opportunity is provided through the game screen G1 for selecting a region, as described above. Therefore, as one example, the gaming providing section 37 may give the selection opportunity by displaying the game screen G1 for selecting a region in the step S11.

Next, in a step S12, the gaming providing section 37 acquires selection status. In concrete terms, as one example of the selection status, the gaming providing section 37 acquires information of the regions MG1 to MG3 which are selected or fixed as attack targets by user characters of own and other gaming machines GM. Further, for example, the gaming providing section 37 acquires the selection status of other gaming machines GM through the center server 2 from each gaming machine GM.

Next, in a step S13, the gaming providing section 37 provides information of the selection status which has acquired in the step S12. As one example, information of selection status is displayed in the information share area IR of the game screen G1 for selecting a region. Therefore, for example, in the step S13, the gaming providing section 37 may provide information of the selection status by displaying the information of the selection status on the information share area IR.

In a next step S14, the gaming providing section 37 determines whether or not a fixedness condition is satisfied. As one of example, as described above, when the decision button image ORa is operated by a touch, a region of an attack target is fixed. Therefore, as one example, a fixedness condition is satisfied when a touch operation is executed to the decision button image ORa. Further, for example, a fixedness condition may be satisfied when a predetermined time has elapsed from provision beginning of the game screen G1 for selecting a region (for example, when remaining time of the remaining time teaching area TR in the example of FIG. 4 has become zero). In this case, the fixedness condition is satisfied surely, with passage of the predetermined time. And, in this case, as one example, a region which is being selected (a region is in a selection) at time which the predetermined time has elapsed may be fixed as an attack target. On the other hand, when no region is selected at time which the predetermined time has elapsed, as one example, a predetermined region may be fixed as an attack target. Further, a region which is selected by least number of users, or which is selected by largest number of users at time which the predetermined time has elapsed may be employed as one example of the predetermined region. And, a fixed region which is determined in advance may be employed as one example of the predetermined region.

If the result of the determination in the step S14 is negative, in other words if the fixedness condition is not satisfied, the gaming providing section 37 returns to the step S12, and executes subsequent processes again. On the other hand, If the result of the determination in the step S14 is positive, in other words if the fixedness condition is satisfied, the gaming providing section 37 terminates this routine. Due to this routine, a selection opportunity is given, and selection status of other user characters is shared in the selection opportunity. In concrete terms, as one example, there is displayed the game screen G1 for selecting a region for providing information of a selection opportunity and selection status of other user characters.

On the other hand, FIG. 8 and FIG. 9 are figures showing an example of a flow chart of a battle processing routine for actualizing the battle processing. As one example, the routine of FIG. 8 and FIG. 9 is repeatedly executed on a predetermined cycle in a battle phase. When the routine of FIG. 8 is started, in a first step S21, the gaming providing section 37 determines whether or not an attack condition is satisfied. As described above, for example, when each user character answers a quiz correctly, each user character attacks an enemy character. Therefore, as one example, an attack condition is satisfied when each user character has answered a quiz correctly. That is, as one example, the gaming providing section 37 determines whether or not each user character has answered a quiz correctly. Further, the gaming providing section 37 acquires a result of a quiz of each gaming machine GM through the center server 2, for executing this determination. And, the gaming providing section 37 executes the determination of the step S21, based on this acquired result of a quiz of each gaming machine GM. If the result of this determination is negative, in other words if the attack condition is not satisfied (if a user character who has answered a quiz correctly does not exist), then the gaming providing section 37 proceeds to a step S24.

On the other hand, if the result of the determination in the step S21 is positive, in other words if the attack condition is satisfied, the gaming providing section 37 proceeds to a step S22. In the step S22, the gaming providing section 37 executes an attack to an enemy character. In concrete terms, based on the result of a quiz which is acquired at the step S21, the gaming providing section 37 controls displays of the game screen G2 for a quiz such that each user character who has answered a quiz correctly attacks an enemy character. Further, a result of a selection through the game screen G1 for selecting a region is reflected to this attack. That is, each user character image 44 is controlled so as to attack a region according to the result of the selection in the game screen G1 for selecting a region. In other words, based on the result of the selection of each user, the gaming providing section 37 controls displays of the game screen G2 for a quiz such that an attack (a change) according to an option which is selected by each user is added. As one example, in the step S22, an attack for an enemy character is actualized by doing the above.

Next, in a step S23, the gaming providing section 37 determines whether or not amount of the HP 45a of the enemy character becomes zero, due to processing of the step S22. If the result of this determination is positive, in other words if the amount of the HP 45a of the enemy character becomes zero, the gaming providing section 37 proceeds to a step S29 of FIG. 9.

On the other hand, if the result of the determination in the step S23 is negative, in other words if the amount of the HP 45a of the enemy character does not become zero, the gaming providing section 37 proceeds to a step S24. In the step S24, the gaming providing section 37 determines whether or not number of given quizzes corresponds to the maximum number of a round. If this result is negative, in other words if the number of given quizzes does not correspond to the maximum number, the gaming providing section 37 returns to the step S21, and executes subsequent processes again.

On the other hand, if the result of the determination in the step S24 is positive, in other words if the number of given quizzes corresponds to the maximum number, the gaming providing section 37 proceeds to a step S25 of FIG. 9. In the step S25, the gaming providing section 37 determines whether or not a request condition is satisfied. As one example, as described above, the request condition is satisfied when the HP of an enemy character declines to a predetermined amount. And, if this result is positive, in other words if a request condition is satisfied, then the gaming providing section 37 proceeds to a step S28.

On the other hand, if the result of the determination in the step S25 is negative, in other words if a request condition is not satisfied, the gaming providing section 37 proceeds to a step S26. In the step S26, the gaming providing section 37 executes an attack on each user character by an enemy character. In concrete terms, the gaming providing section 37 controls displays of the game screen G2 for a quiz such that an enemy character image MG attacks each user character image 44. As one example, an attack for each user character is actualized in the step S26 by doing the above.

Next, in a step S27, the gaming providing section 37 determines whether or not the amount of the HP 46a of user side becomes zero, due to processing of the step S26. If this result of the determination is positive, in other words if the amount of the HP 46a of user side becomes zero, then the gaming providing section 37 proceeds to a step S29.

On the other hand, if the result of the determination in the step S27 is negative, in other words if the amount of the HP 46a of user side does not become zero, the gaming providing section 37 proceeds to a step S28. In the step S28, the gaming providing section 37 determines whether or not the present round is the final round. If this result is negative, in other words if the present round is not the final round, the gaming providing section 37 returns to the step S21 of FIG. 8, and executes subsequent processes again.

On the other hand, if the result of the determination in the step S28 is positive, in other words if the present round is the final round, the gaming providing section 37 proceeds to a step S29. In the step S29, the gaming providing section 37 teaches a result of a battle in the battle phase. In concrete terms, if the processing of the step S29 is executed after the processing of the step S23 in FIG. 8, in other words if the amount of the HP 45a of an enemy character becomes zero as a result of an attack by each user character, the gaming providing section 37 teaches information showing a victory of the team of the user side as a result of the battle. On the other hand, for example, if the processing of the step S29 is executed after the processing of the step S27, in other words if the amount of the HP 46a of the team of the user side becomes zero as a result of an attack by the enemy character, the gaming providing section 37 teaches information showing a loss of the team of the user side as a result of the battle. Further, if the processing of the step S29 is executed after the processing of the step S28, in other words if the team of the user side does not defeat the enemy character even when the final round has ended, the gaming providing section 37 teaches information showing a failure of the battle as a result of the battle. As one example, in the step S29, a result of the battle is taught in such a manner. And, the gaming providing section 37 ends the processing of the step s29, and terminates this routine.

A battle phase described above is actualized by FIG. 8 and FIG. 9. In concrete terms, a battle to aim at defeating an enemy character is actualized by attacks of user characters on an enemy character through a result of each quiz. Further, the result of the selection in the game screen G1 for selecting a region is reflected to an attack of each user character in this battle. As the result, the attack by each user character is executed in a unit of a region according to the result of the selection.

As has been described above, according to this embodiment, in a selection opportunity of an information share phase, information of selection status of each user in a team is provided through the game screen G1 for selecting a region. In concrete terms, through the game screen G1 for selecting a region, information of a region which is selected by other users, or which is fixed as attack targets, is provided to each user. That is, it is unnecessary to do a chat, e-mail and so on, for sharing information of regions of attack targets with each other. Due to this, it is possible to reduce time needed to a share or an exchange of opinions about fixedness of attack targets between users.

Further, information which is in the middle of a selection (before it is fixed) is also provided by the game screen G1 for selecting a region. Due to this, each user can change own attack target appropriately, based on the other user's information which is in the middle of a selection. Therefore, in this case, each user can reflect information of selection status of other users surely to a selection of own attack target. There is not a difference between a comment which is disclosed by each user and an actual action, since a selection action of each user is shared directly. Due to this, it is possible to reduce care of each user, and to suppress the difference between a comment and an action. As the result, it is possible to improve share effect of selection information.

Furthermore, when elapse of predetermined time is employed as a fixedness condition, with the elapse of predetermined time, an attack target is fixed to an option which is selected or a predetermined region. That is, it is possible to fix a region of an attack target automatically with the elapse of predetermined time. Therefore, it is possible to put use time of the game screen G1 for selecting a region within the predetermined time. Due to this, it is possible to reduce time required for an exchange of opinions between users and so on surely within the predetermined time. Further, for example, the most selected region may be adequate as an attack target by a reason such as easiness of clearing or just time before defeating. Therefore, in such a case, it is possible to provide an adequate region as an attack target, if the most selected region is employed as the predetermined region. On the other hand, for example, when the least selected region is employed as the predetermined region, it is possible to achieve a balance between attack targets. As the result, it is possible to improve bias of attack targets.

In the above embodiment, by executing the routine of FIG. 7 via the gaming providing section 37, the control unit 30 of the gaming machine GM functions as the "opportunity giving device" and the "information providing device" of the Claims. Moreover, for example, by executing the step S22 of the routine of FIG. 8 via the gaming providing section 37, the control unit 30 of the gaming machine GM functions as the "change giving device" of the Claims.

The present invention should not be considered as being limited to the embodiment described above; it may be implemented in various other ways as appropriate. In the embodiment described above, for example, a battle process includes an information share phase and a battle phase. And, in the battle phase, through the game screen G2 for a quiz, there is provided a quiz game in which a right answer for a quiz corresponds to an attack directly to an enemy character. However, the battle process is not to be considered as being limited to such the embodiment. For example, the battle process may include a quiz phase. And, when a predetermined condition has been satisfied in the quiz phase, a shift to the battle phase may be executed. That is, a quiz and a battle with an enemy character may be provided separately.

FIG. 10 is a figure schematically showing an example of details of a game screen G3 for a battle when a quiz and a battle are provided separately. As shown in FIG. 10, as one example, similar to the game screen G2 for a quiz, the game screen G3 for a battle includes a enemy character image MG (a category may be different), each user character image 44, and a quiz information area 41. Moreover, the game screen G3 for a battle further includes a user information display area YR and each option section 50 for an action.

Each option section 50 for an action is a section showing an option of a battle action which can be selected by each user character. In the battle phase, each user character executes a battle action corresponding to the selected option section 50 for an action. And, in the game screen G3 for a battle, selection status of each option section 50 for an action is shared as information of selection status of each user.

In concrete terms, in the example of FIG. 10, information of "2 users" is displayed on the option section 50 for an action showing an option corresponding to a battle action of "Attack". Due to this, information that a battle action of "Attack" is considered (selected or fixed) by two users, is shared. In a similar manner, a battle action of "Offensive strength UP" is considered by one user, a battle action of "Recovery" is considered by two users. That is, each option showing such a battle action may function as "option" of the Claims. And, information of selection status about these options may be shared. In this manner, "options" are not limited to regions, options of various types may be employed as "options" of the Claims.

On the other hand, the user information display area YR is an area for displaying information commonly relating to each user character. For example, the user information display area YR includes a user HP gauge 46 (heart type gauge as another example) and an AP-gauge 49. The AP-gauge 49 is a gauge which is extended linearly and is used for showing an amount 49a of AP serving as an amount of predetermined value. AP is concept used as medium (value) showing the availability of an attack of each user. Further, the AP-gauge 49 and the amount 49a of AP are used in a unit of a team. That is, the AP-gauge 49 and the amount 49a of AP are commonly associated and used with all users in a team.

As one example, the amount 49a of AP is used for the shift from a quiz phase to a battle phase. For example, the amount 49a of AP increases or decreases according to a game situation of the quiz phase. As one example, the amount 49a of AP increases according to play time of a quiz game. Further, using right answer situation of a quiz as the game situation, the amount 49a of AP may increase according to number of right answers in the quiz phase. Furthermore, the amount 49a of AP may increase according to a feature of a quiz to which the right answer has been given. In concrete terms, for example, using a difficulty level as the feature of a quiz, the amount 49a of AP may increase such that the amount increases with an increase of the difficulty level of a quiz to which the right answer has been given. And, for example, when the amount 49a of AP exceeds predetermined numerical, a shift to a battle phase may be executed. On the other hand, when a battle action has been executed in a battle phase, in other words when each user character has executed a battle action which has been selected in the game screen G3 for a battle, the amount 49a of AP may decrease. As one example, a battle phase may be configured in this manner. And, a battle phase may be used for both of giving a selection opportunity and sharing information of selection status, via the game screen G3 for a battle (or, a part of a battle phase may also function as an information share phase, and the information share phase may be provided in the battle phase). Therefore, a share of information of a selection opportunity and selection status is not limited to an information share phase described above, may be actualized as embodiments of various types such as a battle phase.

In the embodiment described above, each change corresponding to an option which has been selected by each user in a selection opportunity is given as the result of the selection. In concrete terms, each attack (change) corresponding to each region which has been selected in a selection opportunity is given on the game screen G2 for a quiz. However, the present invention is not to be considered as being limited to such the embodiment. Changes of various types may be given to a game so as to correspond to options of various types. For example, one change may be given based on options corresponding to user characters. For example, only one change corresponding to the option which is most included in a selected option group may be given. For example, in the case of the example of FIG. 4, only left hand region image MG may be attacked by all users who have answered a quiz correctly. That is, a selection opportunity may be used as an opportunity of a vote which determines a battle action or an attack target in a battle with an enemy character such as a region of an attack target.

In the embodiment described above, with a selection of each option, a change corresponding to the selected option is given by each gaming machine GM. However, the present invention is not to be considered as being limited to such the embodiment. For example, a change corresponding to each option may be not given. For example, when each user character is operated by each user, a battle action corresponding to each option may be actualized by an operation of a user, actually. In this case, there may be allowed a difference between the shared selection result and the actual battle action. Therefore, information about selection status of each option may be used only just for a share or an exchange of opinions between users.

In the embodiment described above, options common to each user such as regions of attack targets or battle actions are prepared, such that same option can be selected by each user. However, the present invention is not to be considered as being limited to such the embodiment. Options of various types may be used as "options" of the Claims, as long as used for giving a change. For example, apart from these, options of various types in a game such as items, selections of stories, and so on may be used as "options" of the Claims. Therefore, for example, options which are offered to each user may be not shared with each other. That is, different option groups may be offered to each user.

In the embodiment described above, a game which is provided by each gaming machine GM is not limited to a multiple quiz game. As long as played by a plurality of users at same time, the gaming machine GM may provide games of various types such as an action game, role playing game, a simulation game, and a shooting game.

In a similar manner, the gaming machine GM is not limited to being a gaming machine of the commercial type. For example, it would also be possible to employ a non-portable game for home use (including a non-portable personal computer which is capable of executing a game), a portable gaming machine (including portable terminal which is capable of executing a game such as a smartphone, a personal computer of tablet type, or portable personal computer) and so on as the gaming machine GM, as appropriate. Further, in the embodiment described above, the control unit 30 and the storage unit 31 is provided in the gaming machine GM. However, the present invention is not to be considered as being limited to such the embodiment. For example, the control unit 30 and the storage unit 31 may be provided logically on a network, using the cloud computing. That is, the gaming machine GM may be configured as a terminal providing the result of processing of the control unit 30 by displaying it through the network 3. Furthermore, a game system of the present invention may consist only of the gaming machine GM without the center server 2.

One example of the present invention which is understood by the above description will be described below. Additionally, while reference symbols in the appended drawings are included in parentheses in the following explanation in order to make the present invention simpler to understand, the present invention is not to be considered, due to the use of these reference symbols, as being limited in any way to the embodiment thereof that is disclosed.

The game system of the present invention is a game system (1) that provides a game which is played by a plurality of users at the same time, and wherein the game system comprises: a opportunity giving device (30) configured to give a selection opportunity which is shared by the plurality of users, such that a plurality of used options (MG1 to MG3) corresponding to the plurality of users respectively are selected by the plurality of users respectively from a plurality of options (MG1 to MG3); and an information providing device (30) configured to provide information of selection status relating to the plurality of used options in the selection opportunity.

According to the present invention, information of selection status relating to the plurality of used options is shared in the selection opportunity which is shared by the plurality of users. That is, information of selection status of other users is provided to each user. Therefore, it is unnecessary to create a text and so on in order to exchange opinions about the selection status and so on. Due to this, it is possible to reduce time needed to a share or an exchange of opinions between users in the game.

In one aspect of the present invention, the plurality of used options may be selected in the selection opportunity such that they are fixed when a fixedness condition is satisfied, while a change is allowed until fixing; and, the information of selection status may include information of the plurality of used options before fixing, as information relating to the plurality of used options. In this case, it is possible to provide information which is in the middle of a selection, as the information of selection status. Due to this, each user can change a used option, based on selection status of other users. As the result, it is possible to improve share effect of information of selection status.

In one aspect of the present invention, the fixedness condition may be satisfied when a predetermined time has elapsed in the selection opportunity; and options which are selected at elapsed time of the predetermined time may be fixed as the plurality of used options when the fixedness condition has been satisfied in the selection opportunity, while predetermined options may be fixed as the plurality of used options if options are not selected at the elapsed time of the predetermined time. In this case, it is possible to put time required for an exchange of opinions about selection status within the predetermined time, and so on. Due to this, it is possible to reduce time required for a share or an exchange of opinions between users in the game surely within the predetermined time.

Any options may be employed as the predetermined options. For example, in an aspect in which a fixedness condition is satisfied when predetermined time has elapsed, the plurality of options may be set commonly such that same options can be selected by the plurality of users; and the most selected option at the elapsed time of the predetermined time or the least selected option may be used as a predetermined option. The most selected option may be adequate option. Therefore, in this case, it is possible to provide an adequate option as the predetermined option. On the other hand, when the least selected option is used as the predetermined option, it is possible to improve bias.

Options of various types may be used as the plurality of options. For example, in one aspect of the present invention, the game may include a plurality of ally characters (44) corresponding to the plurality of users respectively, and an enemy character (MG) functioning as an opponent common to the plurality of ally characters; the enemy character may include a plurality of regions (MG1 to MG3); the plurality of options may be associated with the plurality of regions respectively; and the plurality of regions may be selected respectively in the selection opportunity through the plurality of used options. Further, in this aspect, characteristic features may be set to the plurality of regions respectively.

Each option may be used in any way. For example, as one aspect of the present invention, there may be employed an aspect further comprising a change giving device (30) configured to give at least one change according to the plurality of used options to the game, based on a selection result of the selection opportunity. Further, changes of various types may be employed as the one change according to the plurality of used options. For example, in an aspect of present invention in which each option is used for giving the one change, the change giving device may give a plurality of changes corresponding to the plurality of used options respectively, as at least the one change.

Further, the selection opportunity may be given in any way. For example, predetermined value (for example, AP) which is associated with the plurality of users commonly and which increases and decreases according to a situation of the game, may be set; and the opportunity giving device may give the selection opportunity when a amount (49a) of the predetermined value has been exceeds predetermined numerical. In this aspect, a quiz game in which a quiz is given each of the plurality of users, may be employed as the game; right answer situation may be employed as the game situation; and the amount of the predetermined value may increase according to number of right answers, while decreasing with giving of the one change by the change giving device. Further, in this aspect, the amount of the predetermined value may increase such that the amount is different according to a feature of the quiz to which a right answer has been given. Furthermore, in this aspect, a difficulty level may be used as the feature of the quiz; and the amount of the predetermined value may increase such that the amount increases with an increase of the difficulty level of the quiz to which a right answer has been given.

Further, the quiz may be given in any way. For example, one aspect of the present invention in which a quiz game is provided, same number of quizzes may be given to the plurality of users so as to synchronize. Furthermore, in this aspect, details of the quiz may coincide between the plurality of users with each other.

The predetermined value may be provided in any way. For example, in an aspect of the present invention using the predetermined value, the amount of the predetermined value may be displayed through a linear gauge (49).

Further, aspects of various types may be employed as the game system. For example, as one aspect of the present invention, there may be employed an aspect further comprising: a plurality of gaming machines (GM) that provide the game to the plurality of users respectively; a server apparatus (2) that is connected to the plurality of gaming machines through a network (3), and provides gaming machine service relating to the game; and wherein the server apparatus provides a matching service which actualizes matching of the plurality of gaming machines as the gaming machine service such that the game is played by the plurality of users at the same time.

The control method for controlling a computer of the present invention is a control method for controlling a computer (30) which is incorporated into a game system (1) that provides a game which is played by a plurality of users at the same time, and wherein the control method for controlling the computer comprises: a opportunity giving step that gives a selection opportunity which is shared by the plurality of users, such that a plurality of used options (MG1 to MG3) corresponding to the plurality of users respectively are selected by the plurality of users respectively from a plurality of options (MG1 to MG3); and an information providing step that provides information of selection status relating to the plurality of used options in the selection opportunity.

Further, the non-transitory computer readable storage medium storing a computer program for a game system of the present invention stores a computer program for a game system (1) that provides a game which is played by a plurality of users at the same time: and wherein the computer program for the game system is configured so as to cause a computer (30) which is incorporated into the game system, to function as; a opportunity giving device configured to give a selection opportunity which is shared by the plurality of users, such that a plurality of used options (MG1 to MG3) corresponding to the plurality of users respectively are selected by the plurality of users respectively from a plurality of options (MG1 to MG3), and an information providing device configured to provide information of selection status relating to the plurality of used options in the selection opportunity. It is possible to actualize a game system of the present invention by executing the computer program of the storage medium of the present invention or the control method.

What is claimed is:

1. A game system that provides a game which is played by a plurality of users at the same time, and wherein the game system comprises:
    an opportunity giving device configured to give a selection opportunity which is shared by the plurality of users, such that a plurality of used options corresponding to the plurality of users respectively are selected by the plurality of users respectively from a plurality of options; and
    an information providing device configured to provide information of selection status relating to the plurality of used options in the selection opportunity;
    wherein:
    the game includes a plurality of ally characters corresponding to the plurality of users respectively, and an enemy character functioning as an opponent common to the plurality of ally characters;
    the enemy character is displayed on a game screen so as to include a plurality of regions;
    the plurality of options are associated with the plurality of regions respectively; and
    the plurality of regions are selected respectively in the selection opportunity through the plurality of used options.

2. A game system according to claim 1, wherein:
    the plurality of used options is selected in the selection opportunity such that they are fixed when a fixedness condition is satisfied, while a change is allowed until fixing; and,
    the information of selection status includes information of the plurality of used options before fixing, as information relating to the plurality of used options.

3. A game system according to claim 2, wherein:
    the fixedness condition is satisfied when a predetermined time has elapsed in the selection opportunity; and
    options which are selected at elapsed time of the predetermined time are fixed as the plurality of used options when the fixedness condition has been satisfied in the selection opportunity, while predetermined options are fixed as the plurality of used options if options are not selected at the elapsed time of the predetermined time.

4. A game system according to claim 3, wherein:
    the plurality of options are set commonly such that same options can be selected by the plurality of users; and
    the most selected option at the elapsed time of the predetermined time or the least selected option is used as a predetermined option.

5. A game system according to claim 1, further comprising:
    a plurality of gaming machines that provide the game to the plurality of users respectively;
    a server apparatus that is connected to the plurality of gaming machines through a network, and provides gaming machine service relating to the game; and wherein
    the server apparatus provides a matching service which actualizes matching of the plurality of gaming machines as the gaming machine service such that the game is played by the plurality of users at the same time.

6. A game system according to claim 1, wherein characteristic features are set to the plurality of regions respectively.

7. A game system according to claim 1, further comprising a change giving device configured to give at least one change according to the plurality of used options to the game, based on a selection result of the selection opportunity.

8. A game system according to claim 7, wherein the change giving device gives a plurality of changes corresponding to the plurality of used options respectively, as at least the one change.

9. A game system that provides a game which is played by a plurality of users at the same time, and wherein the game system comprises:
    an opportunity giving device configured to give a selection opportunity which is shared by the plurality of users, such that a plurality of used options corresponding to the plurality of users respectively are selected by the plurality of users respectively from a plurality of options;

an information providing device configured to provide information of selection status relating to the plurality of used options in the selection opportunity; and a change giving device configured to give at least one change according to the plurality of used options to the game, based on a selection result of the selection opportunity;

wherein:

a predetermined value which is associated with the plurality of users commonly and which increases and decreases according to a situation of the game, is set; and the opportunity giving device gives the selection opportunity when an amount of the predetermined value has been exceeds predetermined numerical.

10. A game system according to claim 9, wherein:

a quiz game in which a quiz is given each of the plurality of users, is employed as the game;

right answer situation is employed as the game situation; and the amount of the predetermined value increases according to number of right answers, while decreasing with giving of the one change by the change giving device.

11. A game system according to claim 10, wherein the amount of the predetermined value increases such that the amount is different according to a feature of the quiz to which a right answer has been given.

12. A game system according to claim 11, wherein:

a difficulty level is used as the feature of the quiz; and the amount of the predetermined value increases such that the amount increases with an increase of the difficulty level of the quiz to which a right answer has been given.

13. A game system according to claim 10, wherein same number of quizzes are given to the plurality of users so as to synchronize.

14. A game system according to claim 13, wherein details of the quiz coincide between the plurality of users with each other.

15. A game system according to claim 9, wherein the amount of the predetermined value is displayed through a linear gauge.

16. A non-transitory computer readable storage medium storing a computer program for a game system that provides a game which is played by a plurality of users at the same time: and wherein the computer program for the game system is configured so as to cause a computer which is incorporated into the game system, to function as;

an opportunity giving device configured to give a selection opportunity which is shared by the plurality of users, such that a plurality of used options corresponding to the plurality of users respectively are selected by the plurality of users respectively from a plurality of options, and an information providing device configured to provide information of selection status relating to the plurality of used options in the selection opportunity;

wherein:

the game includes a plurality of ally characters corresponding to the plurality of users respectively, and an enemy character functioning as an opponent common to the plurality of ally characters;

the enemy character is displayed on a game screen so as to include a plurality of regions;

the plurality of options are associated with the plurality of regions respectively; and the plurality of regions are selected respectively in the selection opportunity through the plurality of used options.

\* \* \* \* \*